(12) United States Patent
Shahidi et al.

(10) Patent No.: US 7,898,995 B2
(45) Date of Patent: Mar. 1, 2011

(54) DYNAMIC ADJUSTMENT OF INACTIVITY TIMER THRESHOLD FOR CALL CONTROL TRANSACTIONS

(75) Inventors: Reza Shahidi, San Diego, CA (US); Samir Vijay Ginde, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 579 days.

(21) Appl. No.: 11/677,109

(22) Filed: Feb. 21, 2007

(65) Prior Publication Data

US 2008/0198871 A1   Aug. 21, 2008

(51) Int. Cl.
G08C 17/00   (2006.01)
(52) U.S. Cl. .................. 370/311; 370/350; 370/252
(58) Field of Classification Search .......... 370/252, 370/311, 350, 468
See application file for complete search history.

(56) References Cited

U.S. PATENT DOCUMENTS

| | | | | |
|---|---|---|---|---|
| 5,084,969 | A * | 2/1992 | Althaus ................ | 30/79 |
| 7,126,924 | B2 | 10/2006 | Suzuki et al. | |
| 7,289,480 | B2 | 10/2007 | Lundstrom et al. | |
| 7,403,774 | B2 * | 7/2008 | Chandra et al. ......... | 455/432.1 |
| 2005/0052446 | A1 * | 3/2005 | Plut .................. | 345/211 |
| 2006/0067275 | A1 * | 3/2006 | Yang et al. ............. | 370/332 |

FOREIGN PATENT DOCUMENTS

WO   03096730   11/2003

OTHER PUBLICATIONS

International Search Report—PCT/US2008/054624, International Searching Authority—European Patent Office—Sep. 30, 2008.
Written Opinion—PCT/US2008/054624, International Searching Authority—European Patent Office—Sep. 30, 2008.

* cited by examiner

*Primary Examiner*—Phuc Tran
(74) *Attorney, Agent, or Firm*—Francois A. Pelaez; Kevin T. Cheatham

(57) ABSTRACT

In general, this disclosure is directed to establishment and release of a connection between a communication device and an access network. More specifically, the techniques of this disclosure are directed to determining when a data flow used for exchanging call control requests becomes inactive. For example, a communication device may dynamically adjust an inactivity timer threshold associated with the data flow used by applications to exchange call control messages when a new call control transaction starts or an existing call control transaction ends, e.g., by selecting a single inactivity timer threshold for the data flow to satisfy minimum connection requirements of existing call control transactions, recently ended call control transactions and the new call control transaction. The data flow is considered inactive when no applications send or receive messages via the data flow for a period of time that exceeds the adjusted inactivity timer threshold.

51 Claims, 4 Drawing Sheets

DYNAMIC ADJUSTMENT OF INACTIVITY TIMER THRESHOLD FOR CALL CONTROL TRANSACTIONS

TECHNICAL FIELD

This disclosure relates to techniques for establishment and release of a connection between a communication device and an access network.

BACKGROUND

Session Initiation Protocol (SIP) is an application layer signaling and control protocol for establishing and managing delivery of Internet Protocol (IP)-based telephony services in a packet-based network. SIP provides user authentication, redirect and registration services, and can be used to support a variety of telephony services such as audio or video conferencing, text messaging, interactive gaming, and call forwarding. The SIP protocol is described in Request for Comment (RFC) 3261, published in 2002, and prepared by the Internet Engineering Task Force (IETF).

SIP provides several functions for the setup, modification, and termination of sessions. In particular, SIP provides a system of rules for creating, modifying, and terminating sessions over the Internet. SIP is based on an HTTP-like request and response transaction model. Each transaction consists of a request that invokes a particular function and at least one response. SIP is independent of underlying transport protocols and the type of session that is being established. In other words, the details of data exchanged within a session, e.g., the coder-decoder (codec) used in the session, are not controlled by SIP. Instead, SIP is compatible with other protocols to build a multimedia architecture that can provide complete services to end users.

SUMMARY

In general, this disclosure is directed to techniques for establishment and release of connections between a communication device and an access network. These techniques are especially applicable in the wireless context for establishment and release of an air interface. However, the techniques may also be useful in the wired context to reduce bandwidth utilization.

Once a connection between the communication device and the access network is established, the connection may be used by multiple applications executing within the communication device to send and receive data. To this end, the communication device may establish a plurality of data flows, such as radio link protocol (RLP) flows, to service the communication needs of the applications. Each of the data flows may be used to transport traffic with a different Quality of Service (QoS). For example, a first data flow may be used to transport call control messages, a second data flow may be used to transport traffic with a best-effort QoS (i.e., no traffic parameter guarantees), and a third data flow may be used to transport traffic that requires a QoS commitment as to specific traffic parameters (e.g., bandwidth, latency, and packet loss rates).

The communication device monitors activity on the established connection and releases the connection with the access network when no applications are using the connection. As an example, the communication device may associate an inactivity timer threshold with each of the data flows and release the connection with the access network when no data is sent or received on the data flows for a period of time that exceeds the inactivity timer threshold corresponding to each of the data flows. In this manner, the communication device releases the connection when each of the data flows is inactive.

The communication device dynamically adjusts the inactivity timer threshold associated with the data flow used to transport call control messages. As an example, the communication device, in response to a new call control transaction starting or an existing call control transaction ending, selects an inactivity timer threshold that satisfies minimum connection requirements of all existing call control transactions, recently ended call control transactions as well as any new call control transactions. As used herein, the phrase "call control transaction" refers to all call control messages sent between the communication device and a proxy server from a first request up to a final response.

By dynamically adjusting the inactivity timer threshold associated with the data flow used to transport call control messages, the communication device ensures that the connection is maintained for a period of time sufficient to satisfy the connection requirements of the applications. Moreover, in this manner, the techniques of this disclosure reduce the amount of time that elapses between the inactivation of all data flows and the release of the connection, thereby reducing the air interface resource utilization. Additionally, the techniques reduce the likelihood of an inadvertent release of the air interface resources before all of the data flows have become inactive.

In one aspect, a method comprises adjusting an inactivity timer threshold associated with a data flow used by one or more applications to transport call control messages, wherein the inactivity timer threshold is adjusted to satisfy minimum connection requirements of one or more existing call control transactions, one or more recently ended call control transactions, and one or more new call control transactions and determining that the data flow is inactive when no call control messages are sent or received via the data flow for a period of time that exceeds the adjusted inactivity timer threshold.

In another aspect, a communication device comprises a call management module that adjusts an inactivity timer threshold associated with a data flow used by one ore more applications to transport call control messages, wherein the call management module adjusts the inactivity timer threshold to satisfy minimum connection requirements of one or more existing call control transactions, one or more recently ended call control transactions, and one or more new call control transactions and a flow control module that determines that the data flow is inactive when no call control messages are sent or received via the data flow for a period of time that exceeds the adjusted inactivity timer threshold.

In a further aspect, a computer program product comprises a computer-readable medium that includes codes to cause a computer to adjust an inactivity timer threshold associated with a data flow used by one or more applications to transport call control messages, wherein the inactivity timer threshold is adjusted to satisfy minimum connection requirements of one or more existing call control transactions, one or more recently ended call control transactions, and one or more new call control transactions and codes to cause the computer to determine that the data flow is inactive when no call control messages are sent or received via the data flow for a period of time that exceeds the adjusted inactivity timer threshold.

In another aspect, a communication device comprises means for adjusting an inactivity timer threshold associated with a data flow used by one or more applications to transport call control messages, wherein the inactivity timer threshold is adjusted to satisfy minimum connection requirements of one or more existing call control transactions, one or more recently ended call control transactions, and one or more new call control transactions and means for determining that the data flow is inactive when no call control messages are sent or received via the data flow for a period of time that exceeds the adjusted inactivity timer threshold.

The techniques described in this disclosure may be implemented in hardware, software, firmware, or any combination thereof If implemented in software, the software may be executed in a computer. The software may be initially stored as instructions, program code, or the like. Accordingly, the disclosure also contemplates a computer program product for digital video encoding comprising a computer-readable medium, wherein the computer-readable medium comprises codes for causing a computer to execute techniques and functions in accordance with this disclosure.

The details of one or more examples are set forth in the accompanying drawings and the description below. Other features, objects, and advantages of this disclosure will be apparent from the description and drawings, and from the claims.

DETAILED DESCRIPTION

Figure 1:
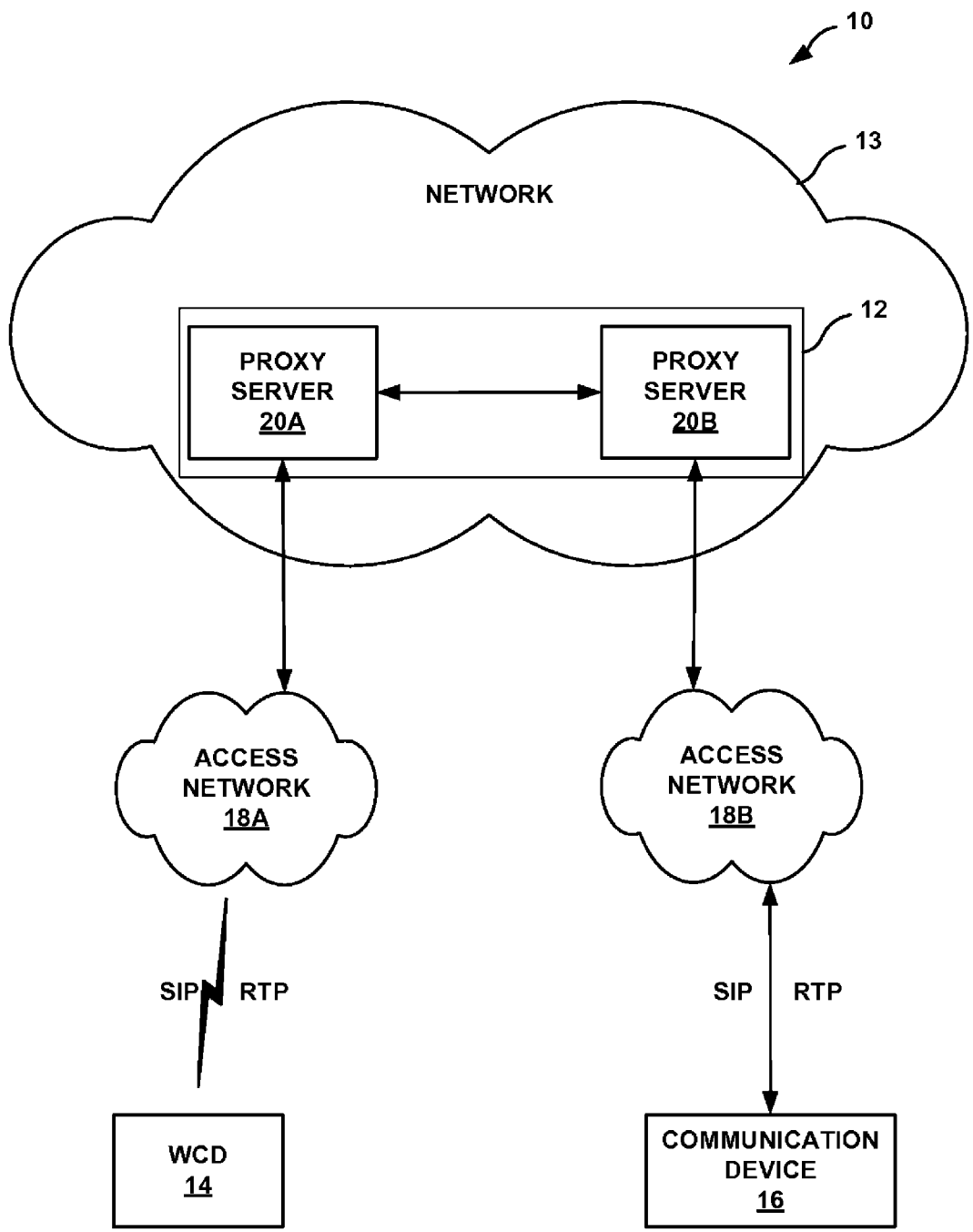
FIG. 1 is a block diagram illustrating a system for management of connections between communication devices and access networks.

In general, this disclosure is directed to techniques for establishment and release of connections between a communication device and an access network. These techniques are especially applicable in the wireless context for establishment and release of an air interface. However, the techniques may also be useful in the wired context to reduce bandwidth utilization.

Once a connection between the communication device and the access network is established, the connection may be used by multiple applications executing within the communication device to send and receive data. As used herein, the term "connection" refers to a communications pathway established over wireless, wired or fiber optic facilities that includes a communication channel or circuit. The communication device may establish a plurality of data flows, such as radio link protocol (RLP) flows, to serve the communication needs of the applications. Each of the data flows may be used to transport traffic with a different QoS. For example, a first data flow may be used to transport call control messages, a second data flow may be used to transport traffic with a best-effort QoS (i.e., no traffic parameter guarantees), and a third data flow may be used to transport traffic that requires a QoS commitment as to specific traffic parameters (e.g., bandwidth, latency, and packet loss rate).

The communication device monitors activity on the established connection and releases the connection with the access network when no applications are using the connection. As an example, the communication device may associate an inactivity timer threshold with each of the data flows and release the connection with the access network when no data is sent or received on the data flows for a period of time that exceeds the inactivity timer threshold corresponding to each of the data flows.

The communication device may be configured to dynamically adjust the inactivity timer threshold associated with one or the data flows in accordance with the techniques of this disclosure. For example, the communication device may be configured to dynamically adjust the inactivity timer threshold associated wit the data flow used to exchange call control messages, such as Session Initiation Protocol (SIP) messages or messages associated with any other type of signaling protocol. More specifically, the communication device, in response to a new call control transaction starting or an existing call control transaction ending, selects an inactivity timer threshold that satisfies minimum connection requirements of existing call control transactions, recently ended call control transactions as well as any new call control transactions. As used herein, the phrase "call control transaction" refers to call control messages sent between the communication device and a proxy server from a first request up to a final response. Additionally, the call control transaction may include an acknowledgement response sent after the final response. For example, if the request is an INVITE request and the final response is a non-2xx response, e.g., per SIP, then the call control transaction may include an ACK to the non-2xx response. If, however, the final response is a 2xx response to an INVITE request, the ACK to the 2xx response is not included in the call control transaction, but is a separate call control transaction. The phrase "2xx response" refers to a final response in a call control transaction. For example, a 200 OK is the final response to a SIP invite.

By dynamically adjusting the inactivity timer threshold associated with the data flow used to transport call control messages, the communication device ensures that the connection is maintained for a period of time sufficient to satisfy the connection requirements of the applications. Moreover, the techniques of this disclosure reduce the amount of time that elapses between the inactivation of all data flows using a connection between a communication device and an access network and the release of the connection. The result is a reduction in the utilization of resources of the access network, which is a concern in wireless applications. Additionally, the techniques reduce the likelihood of an inadvertent release of the connection before all of the data flows have become inactive.

The techniques of this disclosure are described in the context of adjusting an inactivity timer threshold for data flows used to transport call control messages in accordance with a signaling protocol for purposes of example. The techniques may also be used to adjust inactivity timer thresholds for data flows used to transport other types of data. In some aspects, the techniques may be used to adjust inactivity timer thresholds for data flows used to transport media when the data flow used to transport media is tracked across a number of applications.

FIG. 1 is a block diagram illustrating a system 10 for management of connections between communication devices and access networks. System 10 includes a signaling protocol network 12, such as a SIP network or other signaling protocol network, that is embedded in or otherwise coupled to a packet-based communication network 13, such as an Internet Protocol (IP) network. In the example of FIG. 1, a wireless communication device (WCD) 14 communicates with a communication device 16 using a SIP session administered by signaling protocol network 12. In many cases, WCD 14 may communicate with more than one other communication device. For ease of illustration, however, FIG. 1 depicts communication between WCD 14 and only one communication device 16. Thus, system 10 as shown in FIG. 1 is merely exemplary and should not be considered limiting of the techniques as broadly described in this disclosure.

WCD 14 may be any wireless device, such as a cellular telephone, a satellite telephone, a radio telephone, a personal digital assistant (PDA), a so-called SIP phone, a soft phone, a WiFi handset, an IP phone or any other device incorporating wireless communication capabilities. Communication device 16 may be any device incorporating wired or wireless communication capabilities, such as another WCD, a desktop computer, a laptop computer, a fixed telephone or the like. In this disclosure, WCD 14 and communication device 16 may be configured to support SIP or other signaling protocols for Voice-over-Internet-Protocol (VoIP) audio conferencing, video conferencing, text messaging, online gaming, and other packet-based telephony applications.

WCD 14 is coupled to signaling protocol network 12 via an access network 18A. Communication device 16 is coupled to signaling protocol network 12 via another access network 1 8B, which may be wired or wireless. WCD 14 and communication device 16 communicate via access network 18A and B, respectively, according to any of a variety of wireless radio access technologies (RATs) such as Global System for Mobile Communications (GSM), Code Division Multiple Access (CDMA), CDMA 1600, Wideband-CDMA (W-CDMA), 1x Evolution-Data Optimized (1xEV-DO), or the like. Alternatively, or additionally, WCD 14 and communication device 16 may be equipped to communicate according to a wireless local area network (WLAN) protocol such as any of the protocols defined by the various IEEE 801.11x standards. Access networks 18 may include wireless base stations that exchange wireless signals with WCD 14 and communication device 16, and provide a connection to other network clients or servers via a global packet-based core network such as the Internet, a wide area network (WAN), or a local area network (LAN), and/or the public switched telephone network (PSTN).

WCD 14 and/or communication device 16 establish a connection with corresponding access networks 18. In the wireless context, the connection between WCD 14 and access network 18A is sometimes referred to as an air interface. As an example, WCD 14 may establish a connection with access network 18A by sending a connection request to a device within access network 18A. Once a connection is established between WCD 14 and access network 18A, WCD 14 establishes one or more data flows over the connection. WCD 14 may, for example, establish a plurality of RLP flows that service one or more applications executing within WCD 14. The applications executing within WCD 14 may include real-time applications, such as a VoIP application, or fixed bandwidth applications, such as a video streaming application, or a combination thereof. In particular, the applications executing within WCD 14 may exchange data with other devices, such as communication device 16, over one or more of the RLP flows in accordance with any of a number of application layer protocols, including real-time transport protocol (RTP), Hypertext Transfer Protocol (HTTP), SIP or any other signaling protocol, or the like.

For example, the applications executing within WCD 14 may use one of the RLP flows to exchange call control messages with proxy servers 20A and 20B (collectively "proxy servers 20") that act on behalf of WCD 14 and communication device 16 to facilitate the establishment of a communication session. WCD 14, communication device 16 and proxy servers 20 may use one of the RLP flows to exchange call control messages to create, maintain, and terminate a communication session between WCD 14 and communication device 16. WCD 14, communication device 16 and proxy servers 20 may exchange a number of SIP messages, such as INVITE requests, ACCEPT or REJECT responses, and ACK responses to establish the session.

Additionally, one or more of the applications executing within WCD 14 may use other RLP flows to send and receive data such as audio, video, text or other data. For example, one of the RLP flows may be dedicated for use by applications to send and receive multimedia content in accordance with a media transport protocol such as RTP. As another example, another one of RLP flows may be dedicated for use by applications to send and receive data using a best-effort QoS, i.e., with no commitment as to bandwidth, latency, packet loss rate or other specific traffic parameter. In this manner, the RLP flows may be configured to deliver traffic with different QoS requirements. Thus, each of the RLP flows may service traffic from multiple applications executing on WCD 14.

WCD 14 also monitors activity on the established connection and releases the connection with access networks 18 when no applications executing within WCD 14 are using the connection. As an example, WCD 14 may monitor each of the RLP flows on the established connection and release the connection when no packets are sent or received via any of the RLP flows for a period of time that exceeds an inactivity timer threshold associated with each of the RLP flows.

WCD 14 dynamically adjusts the inactivity timer threshold associated with at least one of the RLP flows in accordance with the techniques of this disclosure. In particular, WCD 14 may dynamically adjust the inactivity timer threshold associated with the RLP flow used by the applications to exchange call control messages. For example, WCD 14, in response to a new call control transaction starting or an existing call control transaction ending, selects an inactivity timer threshold that satisfies minimum connection requirements of existing call control transactions, recently ended call control transactions as well as any new call control transactions. In this manner, the inactivity timer threshold is computed in manner that causes the connection to remain open for a period of time that satisfies the minimum connection requirements of all the applications using the RLP flow that transports call control messages. In other words, the adjusted inactivity timer threshold causes the RLP flow that transports call control messages to remain active, thereby causing WCD 14 to maintain the connection with access network 18A.

Similar techniques may be used by communication device 16 to establish, monitor and release an air interface connection with access network 18B.

Figure 2:
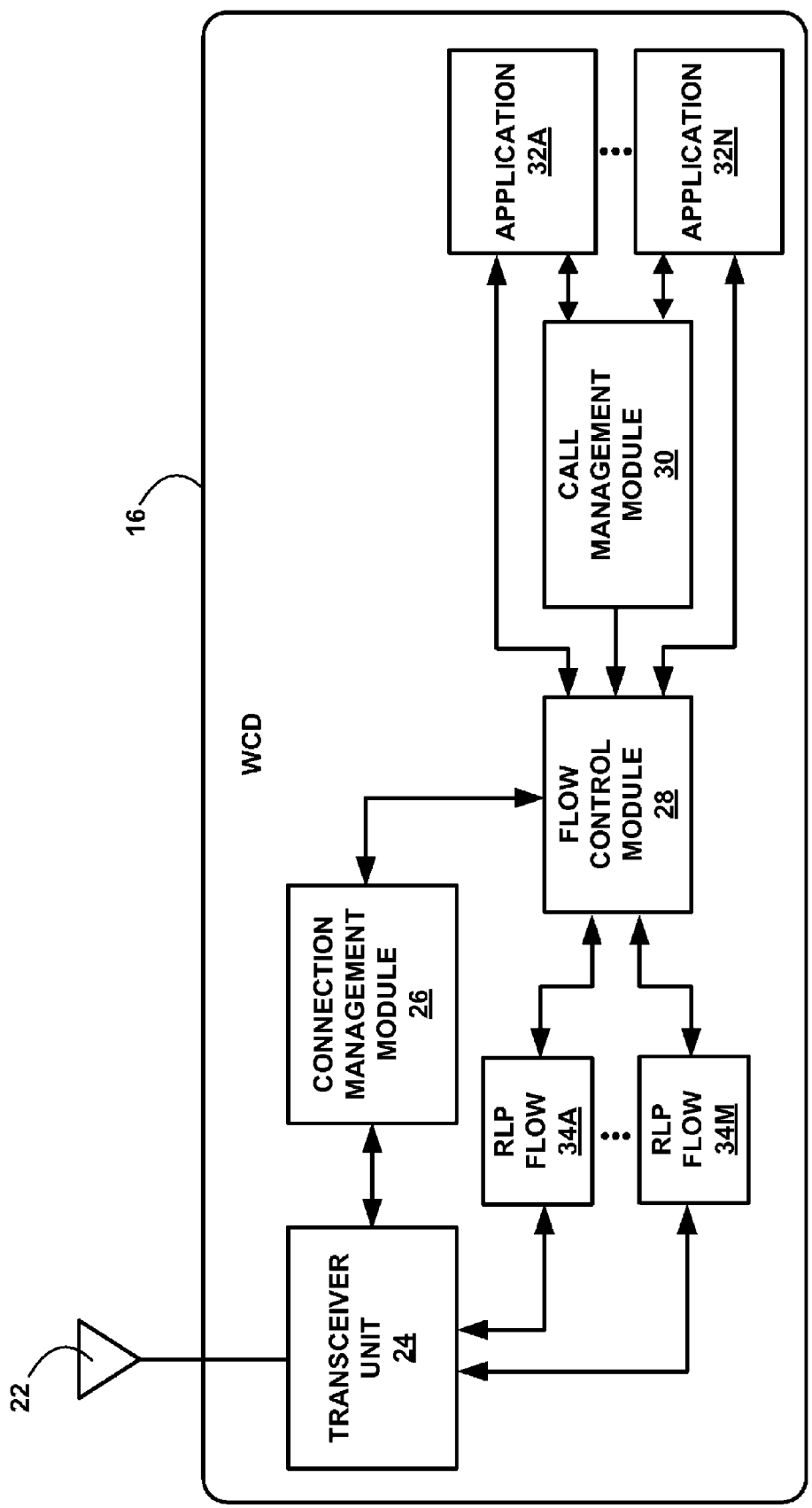
FIG. 2 is a block diagram illustrating example components of a communication device that performs connection management techniques in accordance with this disclosure.

FIG. 2 is a block diagram illustrating example components of a communication device, such as WCD 14 of FIG. 1, that performs the connection management techniques in accordance with this disclosure. In the example illustrated in FIG. 2, the communication device is a wireless communication device. The communication device may, however, comprise a wired communication device or any other type of communication device that includes wired or wireless communication capabilities.

WCD 14 includes an antenna 22, a transceiver 24, a connection management module 26, a flow monitor module 28, a call management module 30 and a plurality of applications 32A-32N (collectively "applications 32"). Transceiver 24 transmits and receives wireless signals via antenna 22. Transceiver 24 may include appropriate analog and/or digital circuit components such as, for example, amplifiers, filters, frequency converters, modulators, demodulators, analog-todigital conversion circuitry, digital-to-analog conversion circuitry, and digital modem circuitry. In operation, antenna 22 transmits and receives wireless signals on radio frequency bands supported by WCD 14. Transceiver 24 may be configured to support any desired radio access technology (RAT) or any WLAN protocol.

Connection management module 26 establishes a connection between WCD 14 and access network 18A (FIG. 1). Connection management module 26 may transmit a request for connection to access network 18A to establish the connection. In response to the request for connection, access network 18A may establish a traffic channel between WCD 14 and access network 18A. Connection management module 26 may, for example, establish a 1xEV-DO connection between WCD 14 and access network 18A. Connection management module 26 may establish multiple connections with access network 18A simultaneously. Connection management module 26 also releases the connection with access network 18A when applications 32 are no longer actively using the connection. As described in more detail below, connection management module 26 may release the connection with access network 18A in response to a request from flow control module 28.

Applications 32 may comprise any type of user applications, such as one or more VoIP applications, video telephony applications, messaging applications (e.g., short message service (SMS) applications or multimedia message service (MMS) applications) or the like. To establish communication sessions over the connection, one or more of applications 32 may exchange call control messages with access network 18A using SIP or other signaling protocol. Applications 32 may, for example, execute user agent client (UAC) and/or user agent server (UAS) processes to pass and receive call control requests and responses from call management module 30. The UAC process may generate and send the request to call management module 30 while the UAS process receives and processes the responses passed from call management module 30. In response to the requests from applications 32, call management module 30 generates and sends one more SIP messages to a corresponding one of proxy servers 20 (FIG. 1) to establish communication sessions for applications 32.

Upon establishment of a SIP session, applications 32 may send and receive data such as audio, video, text or other data to one or more devices. For example, one of applications 32 may be a VoIP application that sends and receives multimedia content in accordance with a media transport protocol such as real-time transport protocol (RTP). As another example, another one of applications 32 may be an electronic mail (e-mail) application that sends messages using a best-effort QoS. As used herein, the phrase "best-effort QoS" refers to the delivery of data to its destination as soon as possible, but with no commitment as to bandwidth, latency, packet loss rate or other specific traffic parameter. In this manner, the traffic channel of the established connection carries traffic from multiple applications 32.

Flow control module 28 may establish a plurality of data flows, such as RLP flows 34A-34M (collectively "RLP flows 34"), to service applications 32. RLP flows 34 allow access network 18A to differentiate between applications 32 that require different QoS commitment. For example, flow control module 28 may activate a first RLP flow (e.g., RLP flow 34A) used by call management module 30 to exchange call control messages, such as one or more SIP requests and responses, with other devices. Additionally, flow management module 72 may activate a second RLP flow 34B for use by applications 32 that utilize best-effort QoS, e.g., messaging applications, and activate a third RLP flow 34C for use by applications 32 that require QoS commitment as to specific traffic parameters (e.g., bandwidth, latency, packet loss rate, etc.), e.g., VoIP applications, video telephony applications, or other applications using a real-time transport protocol (RTP). Thus, the third RLP flow is used by one or more applications to send data using a first QoS reservation. Flow control module 28 may associate communications from a particular one of applications 32 or call management module 30 with a corresponding one of RLP flows 34. In this manner, multiple RLP flows 34 utilize a single connection with access network 18A, and one or more applications 32 utilize each of RLP flows 34 to communicate data.

Flow control module 28 monitors traffic activity on the various RLP flows 34, and instructs connection management module 26 to release the connection with access network 18A when none of applications 32 or call management module 30 are utilizing the connection. In other words, flow control module 28 instructs connection management module 26 to release the connection with access network 18A as soon as there are no active RLP flows using the connection. As an example, flow control module 28 may associate an inactivity timer with each of RLP flows 34 that tracks the amount of time since a packet has been sent or received on the RLP flow. Flow control module 28 may determine that one of the RLP flows 34 is inactive when the inactivity timer exceeds a threshold associated with the corresponding RLP flow. In other words, flow control module 28 determines that RLP flows are inactive when no packets are sent or received for the RLP flow for a period of time that exceeds an inactivity timer threshold for that particular RLP flow.

Flow control module 28 receives the inactivity timer thresholds from one or more of applications 32 and/or from call management module 30. Each of applications 32 may require a different inactivity period before determining that there is no need for the connection, i.e., before the RLP flow is characterized as inactive. As an example, a VoIP application may pass an inactivity timer threshold of infinity for an associated RLP flow used for transporting RTP traffic. Thus, the connection will remain open until the user of WCD 14 ends the VoIP application, e.g., pushes an "end" button. As another example, an inactivity timer threshold associated with the RLP flow servicing best-effort QoS traffic may be twenty (20) seconds. In this case, flow control module 28 determines that the RLP flow servicing best-effort QoS traffic is inactive when no packets are received or sent via the RLP flow for over twenty seconds.

Flow control module 28 also receives an inactivity timer threshold from call management module 30 for the one of RLP flows 34 used by applications 70 to exchange call control messages. Call management module 30 computes the inactivity timer threshold for the RLP flow 34 used by applications 32 to exchange call control messages in accordance with the techniques of this disclosure. Call management module 30 may interact with more than one of applications 32 to exchange SIP messages with proxy servers 20.

Each of applications 32 may require a different inactivity period before determining that its corresponding call control transaction is inactive. Thus, one or more of applications 32 that use call control messaging may require the pertinent RLP flow remain active for a period of time after the call control transaction is complete. As an example, a messaging application may divide a large message into two or more messages of a smaller size and transmit each of the messages consecutively. The messaging application may therefore require the connection to remain open for a period of time after completion of the first transaction in order to send the additional portions of the message without having to re-establish the connection with access network 18A. Other ones of applications 32, such as VoIP applications, may not require the RLP flow for transporting call control messages to remain active after the call control transaction is complete. WCD 14 will maintain the connection with access network 18A as long as one of the RLP flows remains active. Thus, WCD 14 will maintain the connection as long as the RLP flow for transporting call control messages remains active, i.e., until no messages are received for a period of time that exceeds the adjusted inactivity timer threshold.

Any of applications 32 that require the connection with access network 18A to remain open for a period of time after completion of a call control transaction may send call management module 30 an application-specific inactivity timer threshold that specifies the amount of time the particular application wants to maintain the RLP flow as active after the end of the call control transaction. By maintaining the RLP flow as active, the connection is not released. Applications 32 may send the same application-specific inactivity timer threshold regardless of the call control transaction that the applications are initiating. Alternatively, applications 32 may dynamically select the application-specific inactivity timer threshold based on the type of call control transaction the application initiates. For example, the application-specific inactivity timer threshold sent by applications 32 may be shorter for an INVITE transaction than for a MESSAGE transaction that is used to transport instant messages using SIP.

Call management module 30 may assume that the application does not need the RLP flow used to transport call control messages to remain active after the end of the SIP transaction for applications 32 that do not pass an application-specific inactivity timer threshold to call management module 30. Call management module 30 determines an inactivity timer threshold value that satisfies minimum connection requirements of existing call control transactions, recently ended call control transactions and any new call control transactions, and sends the inactivity timer threshold value to flow control module 28 for use in tracking activity on the RLP flow 34 used by applications 32 to exchange call control messages. Thus, call management module 30 selects a single inactivity timer for all of the currently active call control transactions as well as call control transactions that have recently ended but require the RLP flow to remain active, and thus the connection to remain open.

Call management module 30 dynamically adjusts the inactivity timer threshold associated with the RLP 34 used to exchange call control messages each time one of the call control transactions is changed. As an example, call management module 30 may dynamically adjust the inactivity timer threshold when a new call control transaction starts or an existing call control transaction is ends. Additionally, inactivity timer threshold may be adjusted in response to a reset, e.g., reset to zero. In response to any of these "events," call management module 30 selects a new inactivity timer threshold value associated with the one of RLP flows 34 used to exchange call control messages.

As described above, call management module 30 selects a value for the inactivity timer threshold that will satisfy minimum connection requirements of existing call control transactions, recently ended call control transactions and the new call control transaction across the pertinent RLP flow 34. The computation of the inactivity timer threshold may, however, depend on the type of event that occurred. In the case of a new call control transaction starting, such as receiving a request from a UAC process of one of applications 32 or passing a response to a UAS process of one of applications 32, call management module 30 adjusts the inactivity timer threshold to be the larger of a dynamic threshold value ($T_d$) that tracks a maximum amount of time to leave the connection open to satisfy minimum connection requirements of existing call control transactions and recently ended call control transactions and a timer constant ($T_{start}$) that indicates a maximum time required for the call control transaction to complete. In one example, $T_{start}$ may be defined as 64*T1, where T1 is a value from 0.5 to 2 seconds.

The dynamic threshold value $T_d$ is originally initialized to equal zero. Thus, upon the start of the first SIP transaction, the inactivity threshold timer value would be equal to $T_{start}$. At the end of each SIP transaction, however, $T_d$ is recalculated to be the largest of an application-specific inactivity timer threshold value passed by the one of applications 32 associated with the call control transaction (i.e., $T_{app}$), a non-application specific inactivity timer constant ($T_{end}$) that indicates an amount of time required at the end of the call control transaction to allow for retransmitted responses and requests regardless of the application that started the call control transaction, and a difference between the current dynamic threshold value and the time at which the event occurred (i.e., $T_d$-$t_e$). In one example, $T_{end}$ may be defined as 2*T1, where T1 is a value from 0.5 to 2 seconds. In this manner, $T_d$ tracks the minimum amount of time that the connection must be left open to satisfy the minimum connection requirements of all currently active call control transactions and call control transactions that have recently ended.

Moreover, call management module 30 tracks the number of existing call control transactions on the RLP flow 32 used to exchange call control messages. As an example, call management module 30 may include a counter (tcnt) that is incremented and decremented at the start and end of any call control transaction, respectively. Thus, call management module 30 increments the counter by one when a new call control transaction starts. Likewise, call management module 30 decrements the counter by one when an existing call control transaction ends. When the counter is equal to zero, no more call control transactions are pending and the RLP flow remains active long enough to satisfy the dynamic threshold value $T_d$.

If the case of an existing call control transaction ending, such as passing a first final response to a UAC process of one of applications 32 or receiving a first final response from a UAS process of one of applications 32, call management module 30 recalculates the dynamic threshold value ($T_d$) as described above. Additionally, call management module 30 adjusts the inactivity timer threshold value associated with the RLP flow that is used to exchange call control messages. The adjustment of the inactivity timer threshold may depend on whether there are any other existing call control transactions. If there are one or more other existing call control transactions, i.e., tcnt>0, call management module 30 adjusts the inactivity timer threshold value to be equal to the larger of the recalculated dynamic threshold value ($T_d$) and the timer constant ($T_{start}$) If there are no other existing call control transactions, i.e., tcnt=0, call management module 30 adjusts the inactivity threshold value to be equal to the larger of the recalculated dynamic threshold value ($T_d$) and 0.

Call management module 30 also adjusts the inactivity timer threshold upon a reset event. As an example, if the amount of time that has elapsed since sending or receiving a SIP transaction is greater than or equal to the inactivity timer threshold value, call management module 30 resets sets the inactivity timer threshold, as well as the other timer variables to zero.

Regardless of what type of event is detected, however, call management module 30 determines whether the adjusted inactivity timer threshold value is different than the previous inactivity timer threshold value. If the adjusted inactivity timer threshold value is different than the previous inactivity timer threshold value, call management module 30 passes the adjusted inactivity timer threshold value to flow control module 28. If the adjusted inactivity timer threshold value is the same as the previous inactivity timer threshold value, call management module 30 does not pass the adjusted inactivity timer threshold value to flow control module 28.

The various components illustrated in FIG. 2 may be realized in hardware, software, firmware, or any combination thereof. Some components may be realized as processes or modules executed by one or more microprocessors or digital signal processors (DSPs), one or more application specific integrated circuits (ASICs), one or more field programmable gate arrays (FPGAs), or other equivalent integrated or discrete logic circuitry. Depiction of different features as modules is intended to highlight different functional aspects of WCD 14 and does not necessarily imply that such modules must be realized by separate hardware and/or software components. Rather, functionality associated with one or more modules may be integrated within common or separate hardware and/or software components. Thus, the disclosure should not be limited to the example of WCD 14.

When implemented in software, the functionality ascribed to the systems and devices described in this disclosure may be embodied as instructions on a computer-readable medium, such as within a memory (not shown), which may comprise, for example, random access memory (RAM), read-only memory (ROM), non-volatile random access memory (NVRAM), electrically erasable programmable read-only memory (EEPROM), FLASH memory, magnetic or optical data storage media, or the like. The instructions are executed to support one or more aspects of the functionality described in this disclosure.

Figure 3:
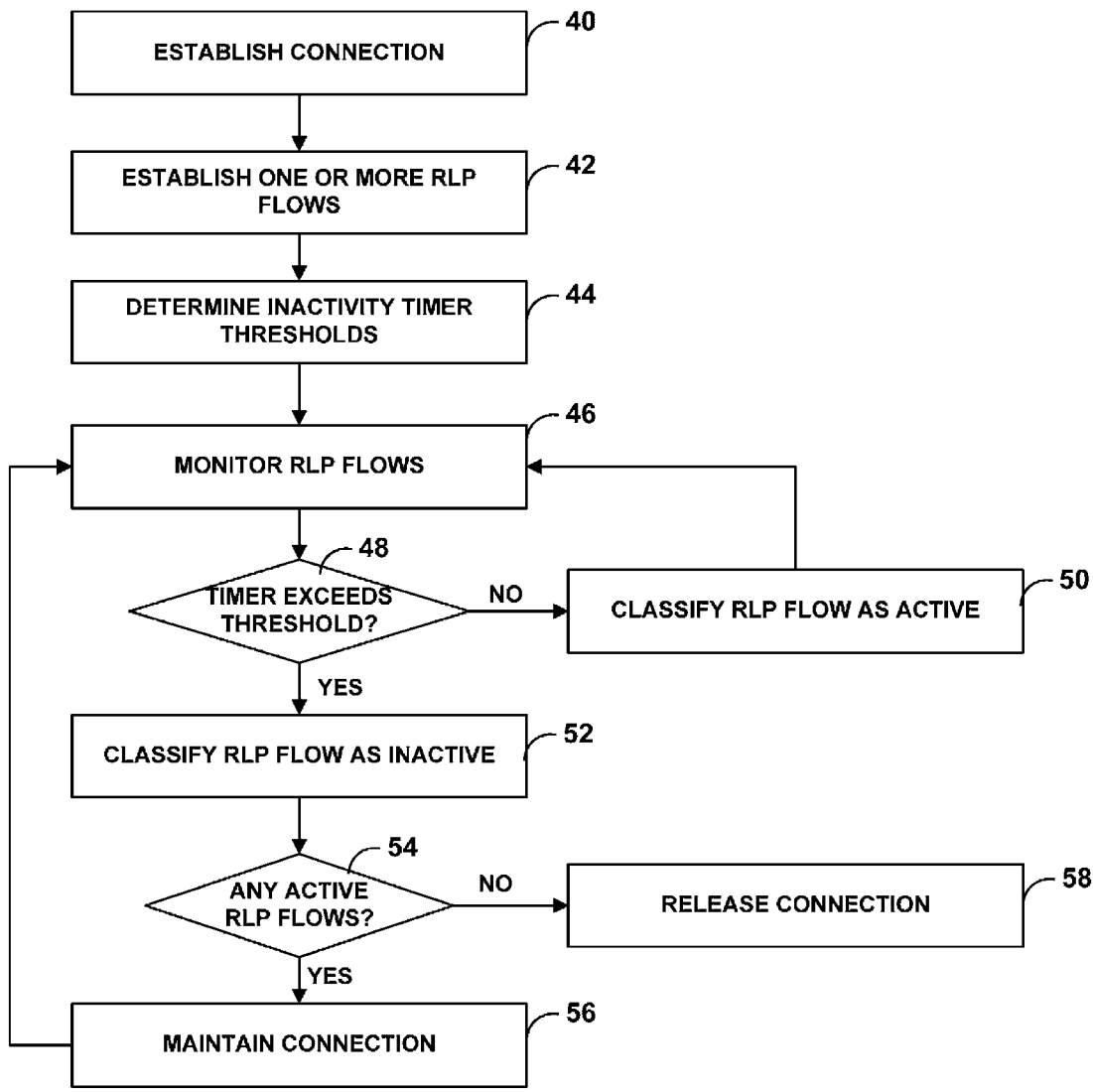
FIG. 3 is a flow diagram illustrating exemplary operation of a communication device in determining when to release a connection with an access network.

FIG. 3 is a flow diagram illustrating exemplary operation of a communication device, such as WCD 14 of FIG. 2, determining when to release a connection with an access network 18A. Initially, WCD 14 establishes a connection with access network 18A (40). For example, connection management module 26 may transmit a request for connection to access network 18A to establish the connection. In response to the request for connection, access network 18A may establish a traffic channel between WCD 14 and access network 18A.

Flow control module 28 establishes one or more data flows, such as RLP flows 34, to service applications 32 (42). Flow control module 28 may establish a plurality of RLP flows 34 that correspond to different QoS reservations or commitments. As an example, flow management module 28 may activate a first RLP flow used to exchange call control messages. Additionally, flow management module 28 may activate one or more other RLP flows 34 for communicating data with different QoS reservations. For example, flow management module 28 may activate a second RLP flow for use by applications sending data using a best-effort QoS, e.g., an e-mail application, and activate a third RLP flow for applications sending multimedia content that requires QoS reservations that specify a commitment to specific traffic parameters (e.g., bandwidth, latency, loss, etc.), e.g., a VoIP application, a video telephony application, or other application that utilizes a media transport protocol such as real-time transport protocol (RTP). In this manner, the established connection carries traffic of multiple applications 32.

Flow control module 28 determines an inactivity timer threshold for each of the RLP flows (44). Flow control module 28 may, for example, receive the inactivity timer thresholds from one or more of applications 32 and/or from call management module 30. Flow control module 28 may, for example, receive inactivity timer thresholds for the RLP flow used for transporting best-effort QoS traffic and the RLP flow used for transporting traffic at the reserved QoS directly from the applications 32 that communicate using those RLP flows. Applications 32 may include the inactivity timer threshold values when a reservation for the RLP flow is activated. Flow control module 28 may select the largest inactivity timer threshold of the plurality of inactivity timer thresholds received from applications 32 as the inactivity timer threshold for that particular RLP flow.

Flow control module 28 also receives an inactivity timer threshold from call management module 30 for the one of RLP flows 34 used for exchanging call control messages. Call management module 30 computes the inactivity timer threshold for the RLP flow 34 that transports call control messages in accordance with the techniques of this disclosure. As described in detail herein, call management module 30 dynamically adjusts the inactivity timer threshold associated with the RLP 34 used to exchange call control messages each time one of the call control transactions is changed. In particular, call management module 30 selects an inactivity timer threshold that satisfies minimum connection requirements of existing call control transactions, recently ended call control transactions as well as any new call control transactions.

Flow control module 28 monitors traffic activity on the various RLP flows 34 (46). As an example, flow control module 28 may associate an inactivity timer with each of RLP flows 34 that tracks the amount of time since data was last sent or received on the corresponding RLP flow. Flow control module 28 determines whether any of the inactivity timers have exceeded the inactivity timer threshold associated with the corresponding RLP flow (48). If flow control module 28 determines that no timer associated with the RLP flows exceeds the corresponding inactivity timer threshold, flow control module 28 classifies the RLP flow as active (50), and continues to monitor the RLP flows (46).

If flow control module 28 determines that a timer associated with one of the RLP flows 34 exceeds the corresponding inactivity timer threshold, flow control module 28 classifies the RLP flow as inactive (52). Flow control module 28 then determines whether there are any active RLP flows (54). If flow control module 28 determines that there is at least one active RLP flow, i.e., at least one inactivity timer does not exceed the corresponding inactivity timer threshold values, connection management module 26 continues to maintain the connection with access network 18A (56).

If flow control module 28 determines that there are no active RLP flows, i.e., all the inactivity timers of the RLP flows exceed the corresponding inactivity timer threshold values, connection management module 26 releases the connection with access network 18A (58). In this manner, WCD 14 manages the connection using the dynamically adjusted inactivity timer threshold. In particular, as long as the RLP flow 34 that transports call control messages remains active, i.e., as long as the inactivity timer threshold is not exceeded, the connection with access network 18A will remain open. Connection management module 26 only releases the connection with access network 18A when there are no active RLP flows using the connection, i.e., when none of applications 32 or call management module 30 are utilizing the connection.

Figure 4:
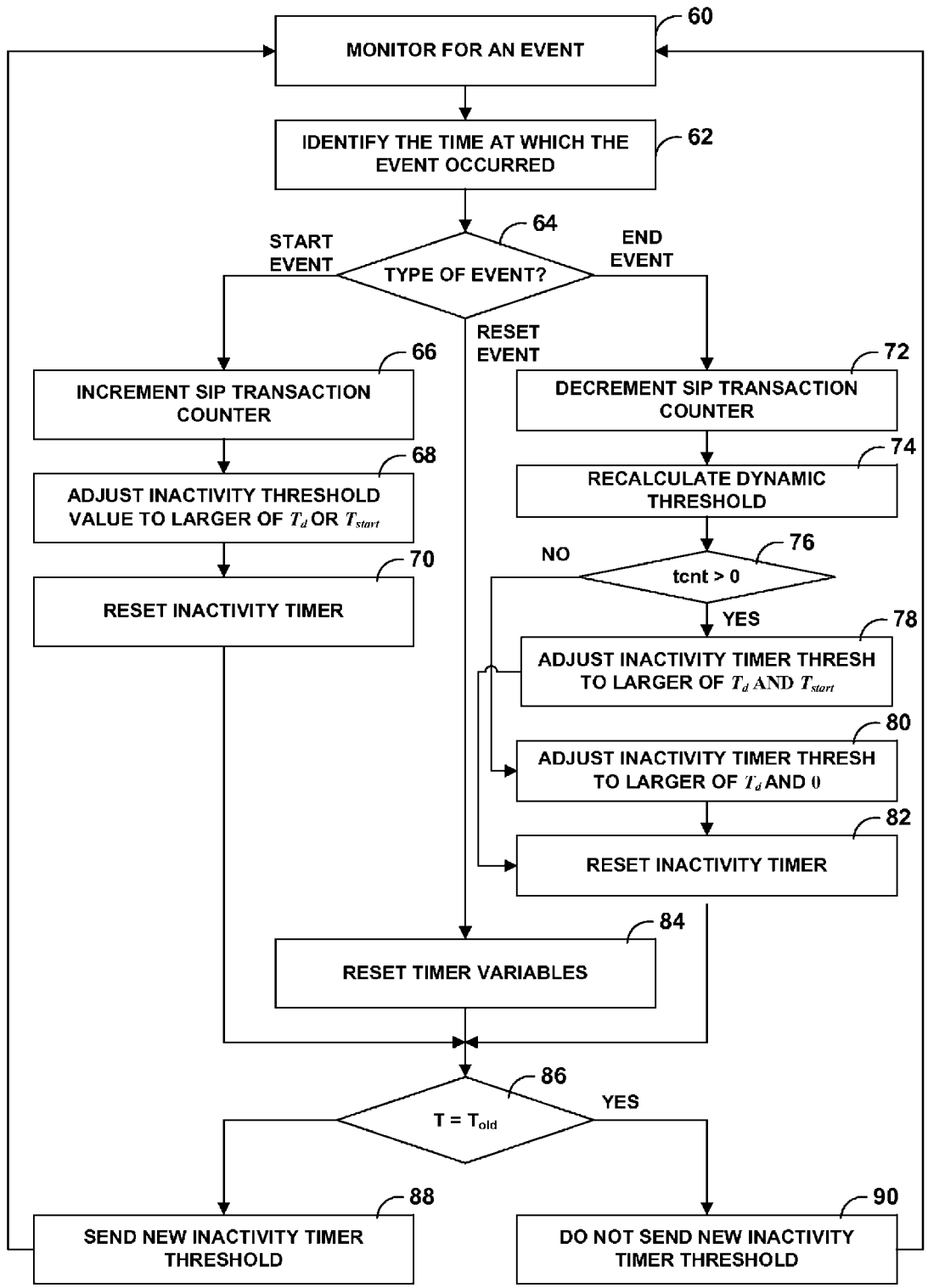
FIG. 4 is a flow diagram illustrating exemplary operation of a call management module in dynamically adjusting an inactivity timer threshold associated with a data flow used to exchange call control messages.

FIG. 4 is a flow diagram illustrating exemplary operation of call management module 30 dynamically adjusting an inactivity timer threshold associated with a data flow used to exchange call control messages in accordance with the techniques of this disclosure. Call management module 30 computes an inactivity timer threshold that satisfies the minimum connection requirements of existing call control transactions, recently ended call control transactions and any new call control transactions.

Call management module 30 monitors for an event that initiates the adjustment of the inactivity timer threshold (60). As described above, call management module 30 may dynamically adjust the inactivity timer threshold when a new call control transaction starts, an existing call control transaction ends, or a timer reset occurs. Upon detecting an event, call management module 30 identifies the time at which the event occurred (62). Call management module 30 may, for example, include an inactivity timer that tracks the amount of time since any SIP communications have been sent or received, and identify the time at which the event occurred using the inactivity timer.

Call management module 30 determines the type of event that occurred (64). As described above, the adjustment of inactivity timer may depend on the type of event that occurs. If a new call control transaction starts (i.e., the event is a start event), such as receiving a request from a UAC process of one of applications 32 or passing a response to a UAS process of one of applications 32, call management module 30 increments a counter that tracks the number of existing call control transactions on the RLP flow used to exchange call control messages (66). Call management module 30 adjusts the inactivity timer threshold value to be equal to the larger of a dynamic threshold ($T_d$) and a timer constant ($T_{start}$) that indicates a maximum time required for the SIP transaction to complete (68). As described above, the dynamic threshold $T_d$ is computed at the end of each SIP transaction, and tracks a maximum amount of time to leave the connection open to satisfy minimum connection requirements of all existing call control transactions as well as recently ended call control transactions. Call management module 30 resets a timer maintained by call management module 30 that counts toward the inactivity timer threshold (70).

If an existing call control transaction ends (i.e., the event is an end event), such as passing a first final response to the UAC process of one of applications 32 or receiving a first final response from the UAS process of one of applications 32, call management module 30 decrements the counter that tracks the number of existing call control transactions on the RLP flow used to exchange call control messages (72). Call management module 30 recalculates the dynamic threshold value ($T_d$) (74). As indicated above, the dynamic threshold value ($T_d$) is recalculated by selecting the largest of an application-specific inactivity timer threshold value passed by the one of applications 32 associated with the call control transaction (i.e., $T_{app}$), a non-application specific inactivity timer constant ($T_{end}$) that indicates an amount of time required at the end of the call control transaction to allow for retransmitted responses and requests regardless of the application that started the call control transaction, and a difference between the current dynamic threshold value and the time at which the event occurred (i.e., $T_d$-$t_e$).

Call management module 30 determines whether there are any other existing call control transactions (76). Call management module 30 may, for example, determine whether the counter that tracks the number of existing call control transactions, i.e., tcnt, is greater than zero. If there are one or more existing call control transactions, i.e., tcnt>0, call management module 30 adjusts the inactivity timer threshold value to be equal to the larger of the recalculated dynamic threshold value ($T_d$) and the timer constant ($T_{start}$) that indicates the maximum time required for for the SIP transaction to complete (78). If there are no other existing call control transactions, i.e., tcnt=0, call management module 30 adjusts the inactivity threshold value to be equal to the larger of the recalculated dynamic threshold value ($T_d$) and 0 (80). In either case, call management module 30 resets a timer maintained by call management module 30 that counts toward the inactivity timer threshold (82).

If a timer that tracks the amount time since any call control messages have been sent or received via the RLP flow that exchanges call control messages exceeds the inactivity timer threshold (i.e., the event is a reset event), call management module 30 resets the inactivity timer threshold (84).

Regardless of what type of event was detected, call management module 30 determines whether the adjusted inactivity timer threshold value T is different than the previous inactivity timer threshold value ($T_{old}$), i.e., whether T=$T_{old}$ (86). If the adjusted inactivity timer threshold value is different than the previous inactivity timer threshold value, call management module 30 passes the recalculated inactivity timer threshold value to flow control module 28 (88). If the recalculated inactivity timer threshold value is the same as the previous inactivity timer threshold value, call management module 30 does not pass the recalculated inactivity timer threshold value to flow control module 28 (90). In this manner, call management module 30 computes a single inactivity timer threshold that satisfies the minimum connection requirements of all existing call control transactions, recently ended call control transactions and any new call control transactions. As described in detail above, the inactivity timer threshold is used to determine whether the RLP 34 that transports call control messages is active. Because WCD 14 does not release the connection with access network 18A until all RLPs 34 are inactive, the dynamically adjusted inactivity timer threshold may be used to maintain the connection to satisfy the minimum connection requirements of all the applications.

The techniques described herein may be implemented in hardware, software, firmware, or any combination thereof. If implemented in software, the techniques may be realized at least in part by one or more stored or transmitted instructions or code on a computer-readable medium. Computer-readable media may include computer storage media, communication media, or both, and may include any medium that facilitates transfer of a computer program from one place to another. A storage media may be any available media that can be accessed by a computer.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage devices, or any other medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be included within the scope of computer-readable media.

The code associated with a computer-readable medium of a computer program product may be executed by a computer, e.g., by one or more processors, such as one or more digital signal processors (DSPs), general purpose microprocessors, application specific integrated circuits (ASICs), field programmable logic arrays (FPGAs), or other equivalent integrated or discrete logic circuitry. In some aspects, the functionality described herein may be provided within dedicated software modules or hardware modules configured for encoding and decoding, or incorporated in a combined video encoder-decoder (CODEC).

Various aspects have been described. These and other aspects are within the scope of the following claims.

The invention claimed is:

1. A method for dynamic establishment and release of a connection between a communication device and an access network, the method comprising:
adjusting an inactivity timer threshold associated with a data flow used by one or more applications to transport call control messages, wherein the inactivity timer threshold is adjusted to satisfy minimum connection requirements of one or more existing call control transactions, one or more recently ended call control transactions, and one or more new call control transactions; and
determining that the data flow is inactive when no call control messages are sent or received via the data flow for a period of time that exceeds the adjusted inactivity timer threshold.

2. The method of claim 1, wherein adjusting the inactivity timer threshold comprises adjusting the inactivity timer threshold when a new call control transaction starts or an existing call control transaction ends.

3. The method of claim 1, wherein adjusting the inactivity timer threshold comprises adjusting the inactivity timer threshold when a new call control transaction starts by selecting the larger of a threshold timer constant ($T_{start}$) that indicates a maximum amount of time required for the new call control transaction to complete and a dynamic threshold value ($T_d$) that tracks a maximum amount of time to maintain a connection with an access network to satisfy minimum connection requirements of existing call control transactions and recently ended call control transactions.

4. The method of claim 3, wherein $T_{start}$ is equal to 64*T1, where T1 is a value between 0.5 to 2 seconds.

5. The method of claim 1, further comprising tracking a number of existing call control transactions on the data flow used by the applications to exchange call control messages.

6. The method of claim 5, wherein tracking the number of existing call control transactions comprises:
maintaining a counter that counts the number of existing call control transactions;
incrementing the counter by one when a new call control transaction starts; and
decrementing the counter by one when an existing call control transaction ends.

7. The method of claim 5, wherein adjusting the inactivity timer threshold comprises adjusting the inactivity timer threshold when an existing call control transaction ends by selecting the larger of a timer constant ($T_{start}$) that indicates a maximum time required for the SIP transaction to complete and a dynamic threshold value ($T_d$) that tracks a maximum amount of time to maintain a connection with an access network to satisfy minimum connection requirements of existing call control transactions and recently ended call control transactions when the number of existing call control transactions on the data flow used by the applications to transport call control messages is greater than zero.

8. The method of claim 5, wherein adjusting the inactivity timer threshold comprises adjusting the inactivity timer threshold when an existing call control transaction ends by selecting the larger of zero and a dynamic threshold value ($T_d$) that tracks a maximum amount of time to maintain a connection with an access network to satisfy minimum connection requirements of existing call control transactions and recently ended call control transactions when the number of existing call control transactions on the data flow used by the applications to transport call control messages is equal to zero.

9. The method of claim 1, further comprising:
determining whether the adjusted inactivity timer threshold is different than a previous inactivity timer threshold; and
passing the adjusted inactivity timer threshold to a data flow control module that determines whether the data flow is being used by any of the applications when the adjusted inactivity timer threshold is different than the previous inactivity timer threshold.

10. The method of claim 1, further comprising:
receiving one or more application-specific inactivity timer threshold values from the applications, wherein each of the application-specific inactivity timer threshold values specifies an amount of time to maintain a connection with an access network after an end of a call control transaction associated with the corresponding application; and
calculating, at the end of a call control transaction, a dynamic threshold value ($T_d$) that tracks a maximum amount of time to maintain the connection to satisfy minimum connection requirements of existing call control transactions and recently ended call control transactions to be the largest of the one of the application-specific inactivity timer threshold values passed by the one of the applications associated with the call control transaction that ended, a non-application specific inactivity timer constant ($T_{end}$) that indicates an amount of time required at the end of the call control transaction to allow for retransmitted call control messages regardless of the application that started the call control transaction, and a difference between a current dynamic threshold value and a time at which the existing call control transaction ends.

11. The method of claim 10, wherein $T_{end}$ is equal to 2*T1, where T1 is a value between 0.5 to 2 seconds.

12. The method of claim 11, further comprising dynamically selecting the application-specific inactivity timer threshold values ($T_{app}$) for each of the applications based on a type of call control transaction initiated by the respective applications.

13. The method of claim 1, further comprising:
establishing a connection between a communication device and an access network;
establishing one or more data flows over the connection, wherein the data flow used by one or more applications to transport call control messages comprises a first data flow; and
releasing the connection between the communication device and the access network when all of the data flows are inactive.

14. The method of claim 13, wherein establishing the connection comprises establishing an air interface between the communication device and the access network.

15. The method of claim 13, wherein establishing the one or more data flows over the connection comprises establishing one or more radio link protocol (RLP) flows that transport data for the applications.

16. The method of claim 15, wherein establishing the one or more RLP flows comprises:
   establishing a first RLP flow for use by one or more of the applications to transport call control messages;
   establishing a second RLP flow for use by one or more of the applications to send data using a best-effort Quality of Service (QoS); and
   establishing a third RLP flow for use by one or more of the applications to send data using a first QoS reservation.

17. The method of claim 1, wherein the applications transport call control messages in accordance with a Session Initiation Protocol (SIP).

18. A communication device comprising:
   a call management module that adjusts an inactivity timer threshold associated with a data flow used by one or more applications to transport call control messages, wherein the call management module adjusts the inactivity timer threshold to satisfy minimum connection requirements of one or more existing call control transactions, one or more recently ended call control transactions, and one or more new call control transactions; and
   a flow control module that determines that the data flow is inactive when no call control messages are sent or received via the data flow for a period of time that exceeds the adjusted inactivity timer threshold.

19. The device of claim 18, wherein the call management module adjusts the inactivity timer threshold when a new call control transaction starts or an existing call control transaction ends 20. The device of claim 18, wherein the call management module adjusts the inactivity timer threshold when a new call control transaction starts by selecting the larger of a threshold timer constant ($T_{start}$) that indicates a maximum time required for the new call control transaction to complete and a dynamic threshold value ($T_d$) that tracks a maximum amount of time to maintain a connection with an access network to satisfy minimum connection requirements of existing call control transactions and recently ended call control transactions.

21. The device of claim 18, wherein the call management module tracks a number of existing call control transactions on the data flow used by the applications to exchange call control messages.

22. The device of claim 21, wherein the call management module maintains a counter that tracks the number of existing call control transactions, wherein the call management module increments the counter by one when a new call control transaction starts and decrements the counter by one when an existing call control transaction ends.

23. The device of claim 21, wherein the call management module adjusts the inactivity timer threshold when an existing call control transaction ends by selecting the larger of a timer constant ($T_{start}$) that indicates a maximum amount of time required for the new call control transaction to complete and a dynamic threshold value ($T_d$) that tracks a maximum amount of time to maintain a connection with an access network to satisfy minimum connection requirements of existing call control transactions and recently ended call control transactions when the number of existing call control transactions on the data flow used by the applications to transport call control messages is greater than zero.

24. The device of claim 21, wherein the call management module adjusting the inactivity timer threshold when an existing call control transaction ends by selecting the larger of zero and a dynamic threshold value ($T_d$) that tracks a maximum amount of time to maintain a connection with an access network to satisfy minimum connection requirements of existing call control transactions and recently ended call control transactions when the number of existing call control transactions on the data flow used by the applications to transport call control messages is equal to zero.

25. The device of claim 18, wherein the call management module determines whether the adjusted inactivity timer threshold is different than a previous inactivity timer threshold and passes the adjusted inactivity timer threshold to the flow control module when the adjusted inactivity timer threshold is different than the previous inactivity timer threshold.

26. The device of claim 18, wherein:
   the call management module receives one or more application-specific inactivity timer threshold values from the applications, wherein each of the application-specific inactivity timer threshold values specifies an amount of time to maintain a connection with an access network after an end of a call control transaction associated with the corresponding application, and
   the call management module calculates, at the end of a call control transaction, a dynamic threshold value ($T_d$) that tracks a maximum amount of time to maintain the connection to satisfy minimum connection requirements of existing call control transactions and recently ended call control transactions to be the largest of the one of the application-specific inactivity timer threshold values passed by the one of the applications associated with the call control transaction that ended, a non-application specific inactivity timer constant ($T_{end}$) that indicates an amount of time required at the end of the call control transaction to allow for retransmitted call control messages regardless of the application that started the call control transaction, and a difference between a current dynamic threshold value and a time at which the existing call control transaction ends.

27. The device of claim 26, wherein the applications dynamically select application-specific inactivity timer threshold values ($T_{app}$) based on a type of call control transaction initiated by the respective applications.

28. The device of claim 18, further comprising:
   a connection management module that establishes a connection between the communication device and an access network,
   wherein the flow control module establishes one or more data flows over the connection, wherein the data flow used by one or more applications to transport call control messages comprises a first data flow, and wherein
   the connection management module releases the connection between the communication device and the access network when all the data flows are inactive.

29. The method of claim 28, wherein the connection management module establishes an air interface between the communication device and the access network.

30. The device of claim 18, wherein the flow control module establishes one or more radio link protocol (RLP) flows over the connection, including a first RLP flow for use by one or more of the applications executing on the communication device to transport call control messages, a second RLP flow for use by one or more of the applications to send data using a best-effort Quality of Service (QoS), and a third RLP flow for use by one or more of the applications to send data using a first QoS reservation.

31. The device of claim 18, wherein the applications transport call control messages via the data flow in accordance with a Session Initiation Protocol (SIP).

32. A non-transitory computer-readable medium for storing an executable computer program product, comprising:
   codes to cause a computer to adjust an inactivity timer threshold associated with a data flow used by one or more applications to transport call control messages, wherein the inactivity timer threshold is adjusted to satisfy minimum connection requirements of one or more existing call control transactions, one or more recently ended call control transactions, and one or more new call control transactions; and
   codes to cause the computer to determine that the data flow is inactive when no call control messages are sent or received via the data flow for a period of time that exceeds the adjusted inactivity timer threshold.

33. The non-transitory computer-readable medium of claim 32, wherein the codes to cause the computer to adjust the inactivity timer threshold further comprise:
   codes to cause the computer to adjust the inactivity timer threshold when a new call control transaction starts or an existing call control transaction ends.

34. The non-transitory computer-readable medium of claim 32, wherein the codes to cause the computer to adjust the inactivity timer threshold further comprise:
   codes to cause the computer to adjust the inactivity timer threshold when a new call control transaction starts by selecting the larger of a threshold timer constant ($T_{start}$) that indicates a maximum amount of time required for the new call control transaction to complete and a dynamic threshold value ($T_d$) that tracks a maximum amount of time to maintain a connection with an access network to satisfy minimum connection requirements of existing call control transactions and recently ended call control transactions.

35. The non-transitory computer-readable medium of claim 32, further comprising:
   codes to cause the computer to track a number of existing call control transactions on the data flow used by the applications to exchange call control messages.

36. The non-transitory computer-readable medium of claim 35, wherein the codes to cause the computer to adjust the inactivity timer threshold further comprise:
   codes to cause the computer to adjust the inactivity timer threshold when an existing call control transaction ends by selecting the larger of a timer constant ($T_{start}$) that indicates a maximum amount of time required for the new call control transaction to complete and a dynamic threshold value ($T_d$) that tracks a maximum amount of time to maintain a connection with an access network to satisfy minimum connection requirements of existing call control transactions and recently ended call control transactions when the number of existing call control transactions on the data flow used by the applications to transport call control messages is greater than zero.

37. The non-transitory computer-readable medium of claim 35, wherein the codes to cause the computer to adjust the inactivity timer threshold further comprise:
   codes to cause the computer to adjust the inactivity timer threshold when an existing call control transaction ends by selecting the larger of zero and a dynamic threshold value ($T_d$) that tracks a maximum amount of time to maintain a connection with an access network to satisfy minimum connection requirements of existing call control transactions and recently ended call control transactions when the number of existing call control transactions on the data flow used by the applications to transport call control messages is equal to zero.

38. The non-transitory computer-readable medium of claim 32, further comprising:
   codes to cause the computer to receive one or more application-specific inactivity timer threshold values from the applications, wherein each of the application-specific inactivity timer threshold values specifies an amount of time to maintain a connection with an access network after an end of a call control transaction associated with the corresponding application; and
   codes to cause the computer to calculate, at the end of a call control transaction, a dynamic threshold value ($T_d$) that tracks a maximum amount of time to maintain the connection to satisfy minimum connection requirements of existing call control transactions and recently ended call control transactions to be the largest of the one of the application-specific inactivity timer threshold values passed by the one of the applications associated with the call control transaction that ended, a non-application specific inactivity timer constant ($T_{end}$) that indicates an amount of time required at the end of the call control transaction to allow for retransmitted call control messages regardless of the application that started the call control transaction, and a difference between a current dynamic threshold value and a time at which the existing call control transaction ends.

39. The non-transitory computer-readable medium of claim 38, further comprising:
   codes to cause the computer to dynamically select the application-specific inactivity timer threshold values ($T_{app}$) for each of the applications based on a type of call control transaction initiated by the respective applications.

40. The non-transitory computer-readable medium of claim 32, further comprising:
   codes to cause the computer to establish a connection between a communication device and an access network;
   codes to cause the computer to establish one or more data flows over the connection, wherein the data flow used by one or more applications to transport call control messages comprises a first data flow; and
   codes to cause the computer to release the connection between the communication device and the access network when all of the data flows are inactive.

41. The non-transitory computer-readable medium of claim 40, wherein the codes to cause the computer to establish the one or more data flows over the connection further comprise:
   codes to cause the computer to establish one or more radio link protocol (RLP) flows that transport data for the applications.

42. The non-transitory computer-readable medium of claim 32, wherein the applications transport call control messages in accordance with a Session Initiation Protocol (SIP).

43. A communication device comprising:
   means for adjusting an inactivity timer threshold associated with a data flow used by one or more applications to transport call control messages, wherein the inactivity timer threshold is adjusted to satisfy minimum connection requirements of one or more existing call control transactions, one or more recently ended call control transactions, and one or more new call control transactions; and means for determining that the data flow is inactive when no call control messages are sent or received via the data flow for a period of time that exceeds the adjusted inactivity timer threshold.

44. The device of claim 43, wherein the adjusting means adjusts the inactivity timer threshold when a new call control transaction starts or an existing call control transaction ends.

45. The device of claim 43, wherein the adjusting means adjusts the inactivity timer threshold when a new call control transaction starts by selecting the larger of a threshold timer constant ($T_{start}$) that indicates a maximum amount of time required for the new call control transaction to complete and a dynamic threshold value ($T_d$) that tracks a maximum amount of time to maintain a connection with an access network to satisfy minimum connection requirements of existing call control transactions and recently ended call control transactions.

46. The device of claim 43, further comprising means for tracking a number of existing call control transactions on the data flow used by the applications to exchange call control messages.

47. The device of claim 46, wherein the adjusting means adjusts the inactivity timer threshold when an existing call control transaction ends by selecting the larger of a timer constant ($T_{start}$) that indicates a maximum amount of time required for the new call control transaction to complete and a dynamic threshold value ($T_d$) that tracks a maximum amount of time to maintain a connection with an access network to satisfy minimum connection requirements of existing call control transactions and recently ended call control transactions when the number of existing call control transactions on the data flow used by the applications to transport call control messages is greater than zero.

48. The device of claim 46, wherein the adjusting means adjusts the inactivity timer threshold when an existing call control transaction ends by selecting the larger of zero and a dynamic threshold value ($T_d$) that tracks a maximum amount of time to maintain a connection with an access network to satisfy minimum connection requirements of existing call control transactions and recently ended call control transactions when the number of existing call control transactions on the data flow used by the applications to transport call control messages is equal to zero.

49. The device of claim 43, further comprising:

means for receiving one or more application-specific inactivity timer threshold values from the applications, wherein each of the application-specific inactivity timer threshold values specifies an amount of time to maintain a connection with an access network after an end of a call control transaction associated with the corresponding application; and means for calculating, at the end of a call control transaction, a dynamic threshold value ($T_d$) that tracks a maximum amount of time to maintain the connection to satisfy minimum connection requirements of existing call control transactions and recently ended call control transactions to be the largest of the one of the application-specific inactivity timer threshold values passed by the one of the applications associated with the call control transaction that ended, a non-application specific inactivity timer constant ($T_{end}$) that indicates an amount of time required at the end of the call control transaction to allow for retransmitted call control messages regardless of the application that started the call control transaction, and a difference between a current dynamic threshold value and a time at which the existing call control transaction ends.

50. The device of claim 49, further comprising means for dynamically selecting the application-specific inactivity timer threshold values ($T_{app}$) for each of the applications based on a type of call control transaction initiated by the respective applications.

51. The device of claim 43, further comprising:

means for establishing a connection between a communication device and an access network;

means for establishing one or more data flows over the connection, wherein the data flow used by one or more applications to transport call control messages comprises a first data flow; and means for releasing the connection between the communication device and the access network when all of the data flows are inactive.

* * * * *